US006675153B1

(12) United States Patent
Cook et al.

(10) Patent No.: US 6,675,153 B1
(45) Date of Patent: Jan. 6, 2004

(54) TRANSACTION AUTHORIZATION SYSTEM

(75) Inventors: David P. Cook, Dallas, TX (US); Gary G. Liu, Plano, TX (US)

(73) Assignee: Zix Corporation, Dallas, TX (US)

( * ) Notice: Subject to any disclaimer, the term of this patent is extended or adjusted under 35 U.S.C. 154(b) by 0 days.

(21) Appl. No.: 09/374,073

(22) Filed: Aug. 12, 1999

Related U.S. Application Data

(60) Provisional application No. 60/142,575, filed on Jul. 6, 1999.

(51) Int. Cl.[7] .............................................. G06F 17/60
(52) U.S. Cl. .............................. 705/74; 705/64; 705/67; 705/75; 705/76; 713/156; 713/150; 713/155
(58) Field of Search ...................... 705/64–79; 713/150, 713/155, 156, 176, 178

(56) References Cited

U.S. PATENT DOCUMENTS 5,915,022 A * 6/1999 Robinson et al. ............. 380/24
6,330,544 B1 * 12/2001 Walker et al. ................. 705/14
6,341,353 B1 * 1/2002 Herman et al. .............. 713/201

FOREIGN PATENT DOCUMENTS

WO    WO 99/16029    * 4/1999    ............ G07F/7/10

OTHER PUBLICATIONS

Camenisch et al., "An Efficient Fair Payment Sydtem", 1996, ACM.*

* cited by examiner

Primary Examiner—James P. Trammell
Assistant Examiner—Jalatee Worjloh
(74) Attorney, Agent, or Firm—Fish & Richardson P.C.

(57) ABSTRACT

A method and apparatus for authorizing a transaction between a consumer and a merchant over a network where the anonymity of the consumer with respect to the merchant is maintained while still validating the authenticity of the consumer prior to completing the transaction. The method includes registering consumer payment information at a payment server and launching a charge slip application including securely transferring unique transaction information for display to the consumer. The consumer digitally signs the charge slip and encrypts the charge slip and consumer digital signature with a payment server key. The merchant digitally signs the encrypted charge slip data. The payment server authenticates the consumer, the merchant and the transaction details at the payment server and requests authorization of the transaction from a card processor. Upon approval, the payment server returns an approval and shipping information for the consumer to the merchant so that the transaction can be completed.

72 Claims, 5 Drawing Sheets

FIGURE 2

TRANSACTION AUTHORIZATION SYSTEM

This application is a utility conversion of and claims the benefit of priority under 35 U.S.C. 119(e)(1) to U.S. provisional application serial No. 60/142,575, filed Jul. 6, 1999. The disclosure of the prior application is considered part of the disclosure of this application and is incorporated herein by reference.

The present invention relates generally to electronic commerce and more particularly to a method and apparatus for electronic transaction authorization over a network.

BACKGROUND

One problem regarding Internet e-commerce is that purchasers are generally required to provide personal and confidential information, such as charge card information and charge card billing data to an Internet merchant when purchasing goods or services from that merchant. The merchant, in turn, uses this information to obtain a transaction approval from a charge card authorization processor. The transmission of data from a purchaser's computer or terminal to the merchant Web site is generally protected by encryption.

However, once under the control of a merchant Web site, this personal data can be sold, rented, or otherwise used for commercial gain. Further, the storage and handling of this sensitive data by computer personnel at the merchant site may lead to unauthorized distribution of the data. Internet merchant sites are targets for hackers who may be able to obtain access to this data. In certain instances, accidental release of the data has been made by errors in the software programs that operate a given Web site. A purchaser who has had personal or charge card information compromised may then be the victim of unauthorized use of their charge cards or, in more severe cases, complete theft of their identity.

Another problem is the fraudulent use of charge cards. Since it is difficult to determine the identity of a remote purchaser, particularly as it relates to ownership of a given charge card, fraudulent charge card use has become popular on the Internet.

An additional problem is the use of E-mail addresses or real billing addresses obtained by a merchant during a purchase transaction. The merchant may continue to send unwanted solicitations to the purchaser long after a transaction is completed. In some cases, the abuse of the E-mail address may include sending the E-mail address to other parties, who may also send unwanted solicitations or "spam" to the purchaser.

SUMMARY OF THE INVENTION

A distributed real-time software application (referred to herein as "ZixCharge") is provided that allows consumers to authorize transactions in a secure, private, and convenient manner for the purchase of goods and services over the Internet. The major architectural features of the ZixCharge system include a central repository of consumer data, a charge slip user interface, ZixCharge Web site application interface (hereinafter, ZAPI), a centralized approval service, a worldwide signature server and Internet shopping mall (referred to herein as "ZixMall").

The ZixCharge system provides a central repository of consumer charge card information. Each charge card is linked to a specific E-mail address and digital signature. This information is normally provided by card issuing financial institutions and others, but can be entered under certain circumstances directly by consumers. The data is provided by a reputable source (either a card issuer or an individual each of which can be authenticated) that can irrefutably link a consumer's identity with their charge card information. The central repository is used to obtain a charge authorization without providing any personal information to the merchant.

The ZixCharge system provides a charge slip interface that allows a consumer to digitally sign for a purchase—just as the consumer would do in a retail store. The charge slip can be initiated by the merchant site, and can include the merchant logo, detailed purchase information, merchant advertising, and other information. The charge slip interface can be used by a consumer to select the payment type (if appropriate), shipping address options, and a method for merchant communications regarding the purchase. Once digitally signed, the charge slip information, including a certified time-stamp, is returned to the merchant Web site, but it cannot be opened or read there. It is fully encrypted so that only the ZixCharge central repository can read it.

The ZixCharge system includes a merchant to consumer interface, ZAPI, that resides on the merchant Web site. ZAPI provides all communication services between the merchant and the consumer during the charge slip portion of an authorization, and between the merchant and the central repository. ZAPI can be configured to offer a consumer who has failed an authorization, due to credit limits or other causes, the opportunity to select a different payment type in order to complete the transaction. After a transaction is approved, ZAPI provides the merchant with approval and shipping information. The merchant system can complete the transaction and fulfillment just as if the approval had been obtained directly by the merchant. ZAPI also ensures the transaction's validity. ZAPI combines three items, a certified time-stamp, the "hash" of the charge slip information and the returned encrypted charge slip from the consumer. ZAPI digitally signs the combination with the merchant's digital signature before sending the transaction to the central repository.

The ZixCharge system provides charge approval services at the central repository. All incoming charge slips are decrypted, validated by the previously mentioned "hash," and authenticated by verifying the digital signatures of both the merchant and the consumer. The central repository formats an authorization message containing the required information to obtain a charge card authorization on behalf of both the consumer and the merchant and then forwards the-message to a charge card processor, normally over dedicated communication lines. Upon receiving approval, or not, for the authorization, the central repository sends the authorization information back to ZAPI at the merchant Web site. If a successful authorization has been obtained, the returned information will include any consumer authorized shipping information. E-mail communications for any transaction specific information is normally sent to the central repository and then forwarded to the consumer. This process allows the consumer to keep their respective E-mail address private. The merchant is also given a ZixCharge member ID. This enables the merchant to aggregate transactions for marketing purposes and to communicate with the consumer through the ID, but still protects the consumer's actual identity. The consumer can optionally block the forwarding of messages sent to the member ID.

The ZixCharge system utilizes a worldwide signature. server (central key server). The central key server, which can be distributed, allows the ZixCharge system to instantly authenticate both the merchant and the consumer in a transaction. The central key server further ensures that a given digital signature has not been revoked, suspended, changed or deleted. The central signature server also responds to requests for and issues certified time-stamps. The time-stamp certificate can be self-authenticated (authenticated by at least one signature whose public key is known) and is impossible to tamper with or change. This provides further authentication and validation.

The ZixCharge system can include an optional Internet shopping portal (referred to hereafter as the "ZixMall"). Merchants who accept payment, or allow other types of transaction authorizations, using the ZixCharge system, may be listed in the ZixMall. When consumers shop through the ZixMall, they are assured that the merchant respects their privacy and is willing to sell merchandise or services to them without collecting unnecessary personal information.

Aspects of the invention can include one or more of the following advantages. A distributed real-time software application (referred to herein as "ZixCharge") is provided that allows consumers to authorize transactions in a secure, private, and convenient manner for the purchase of goods and services over the Internet. The system allows consumers to complete purchase transactions without merchants obtaining personal and charge card information from the consumer. ZixCharge transactions have three major participants: consumers, merchants and charge card issuers. Each of these participants benefits from the use of ZixCharge.

Consumers benefit by having personal and credit card information, and purchasing histories kept confidential. Because fewer Web sites have the consumer's information, there is less chance of their identities or their credit cards being used by others. Consumers also have the convenience of only having to digitally "sign" a charge slip in order to complete a purchase.

Merchants benefit by realizing a dramatic reduction in fraudulent transactions. The reduction can be attributed to the use of digital signatures on charge slips which positively identify a party to a transaction. Merchants accepting Zix-Charge transactions will have access to large numbers of Internet consumers who are members of the ZixCharge system. Many of the ZixCharge members will be new to Internet shopping—in fact—shopping only because Zix-Charge protects their confidential information.

Card issuers benefit in numerous ways. Using the Zix-Charge system, card issuers can control the dissemination (and abuse) of cardholder information and foster brand loyalty and goodwill with consumers. These types of features can be used by card issuers to differentiate their cards from the competition allowing them to retain existing and obtain new cardholders. In addition, card issuers can re-enforce their identity with prominent logo placement (display) throughout the purchase process. Finally, card issuers can realize new revenue from ZixCharge fees. These and other advantages will be readily apparent from the description below.

BRIEF DESCRIPTION OF THE DRAWINGS

FIG. 2 shows a charge slip for use with the Internet payment authorization system.

A number of terms are used herein to describe transaction authorization systems and related entities.

"Consumer" or "Member" refers to the role that is played by anyone who shops for goods or services from merchants and uses payment system 100 (FIG. 1) to authorize the resulting purchases.

"Merchant" refers to an organization that sells goods and/or services to members using payment system 100 (FIG. 1) or to a Web site that performs hosted computing services on behalf of a merchant in the pursuit of e-commerce.

Figure 1:
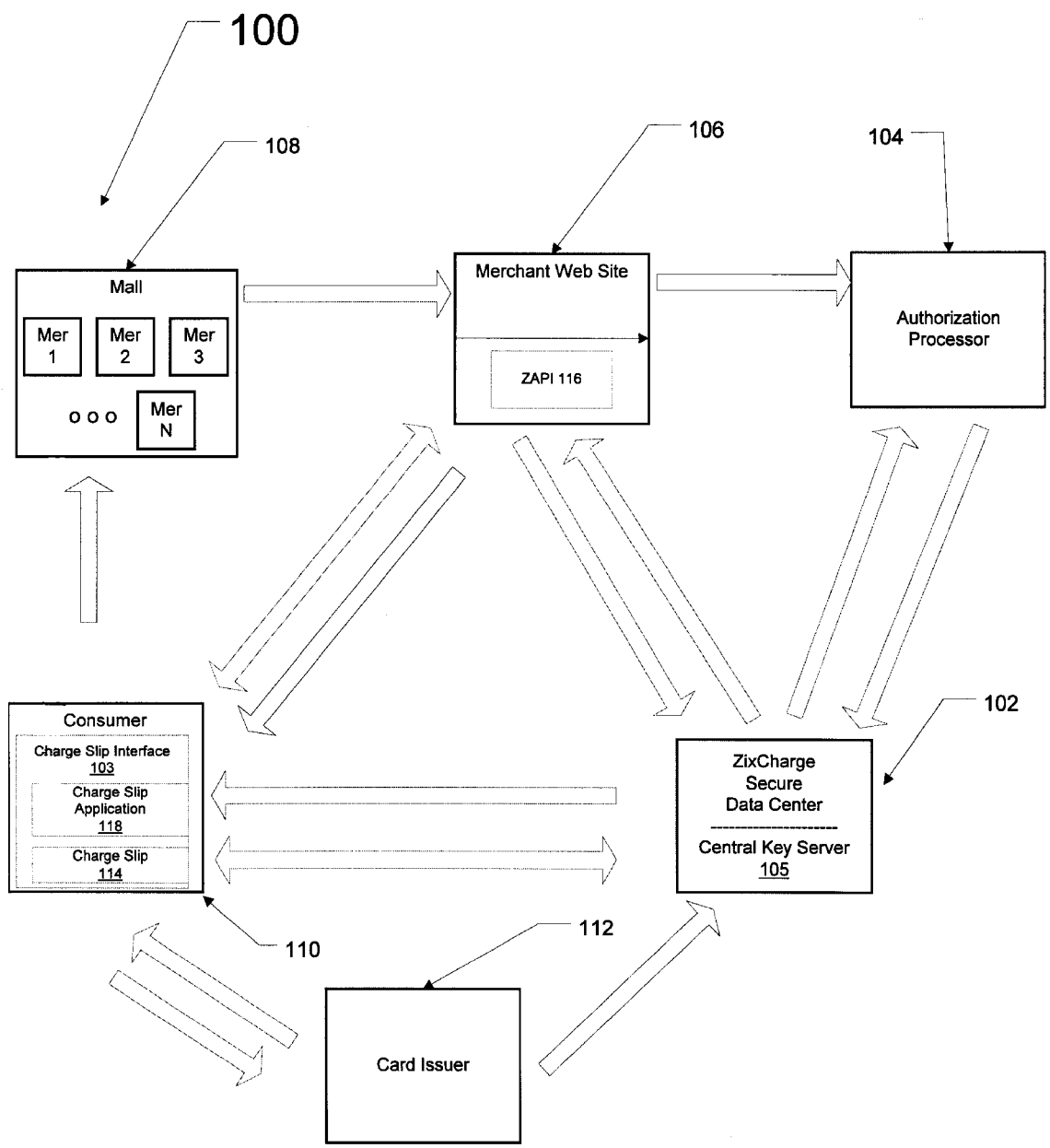
FIG. 1 shows an Internet payment authorization system.

"Affiliate" as used herein, refers to an organization that is affiliated with payment system 100 (FIG. 1). Affiliates include sponsors and merchants. "Sponsor" refers to an organization that provides member information (i.e., E-mail address and credit card information). Sponsors include card issuers. "Card issuer" refers to a bank or other organization that issues charge cards.

"Internet Service Provider" (ISP) refers to an organization that provides Internet access. An ISP can be a Sponsor.

"Authorization Processor" or "Card Processor" refers to one of the organizations used by payment system 100 (FIG. 1) to authorize card purchases. Different merchants can use different card processors (e.g., First Data Corporation). An authorization processor is an affiliate.

"Transaction" refers to an interaction or exchange between a merchant and a consumer. Typically, a transaction is conducted remotely, that is using a medium, such as the Internet, to execute the transaction. As such, the parties to the transaction must be able to be authenticated to ensure the integrity of the transaction. A transaction can include the purchase of goods or services from the merchant, and require payment by the consumer. Other types of transactions can also be authorized using the methods disclosed herein.

"Shipping address" refers to a destination for delivery of goods or services for a transaction. The delivery can be made to a home address, an E-mail address, a URL or an IP address. In some transactions, no delivery is required, and as such the designation of a shipping address may not be required.

Referring now to FIG. 1, a top-level view of a payment system 100 is shown. Payment system 100 includes secure data center 102, charge slip interface 103, authorization processor 104, merchant Web site 106, mall 108, cardholder (member) 110 and credit card issuer 112.

Payment system 100 uses a central repository of consumer charge card information stored in secure data center 102. Each charge card account is linked to a specific E-mail address. This linkage allows for use of a verifiable digital signature for transaction authorizations. The paired data (charge card data and E-mail address) is normally provided by a reputable source, such as credit card issuer 112, that can link a consumer's E-mail identity with their charge card information.

Central Repository

Secure data center 102 is operable to obtain charge authorization services without requiring a consumer to provide personal and charge card information to the requesting merchant. In one implementation, the centralized data repository is not used for any other commercial purpose. In one implementation, secure data center 102 includes a central key server 105 for use in authenticating consumers and merchants.

Charge Slip Interface

Figure 2:
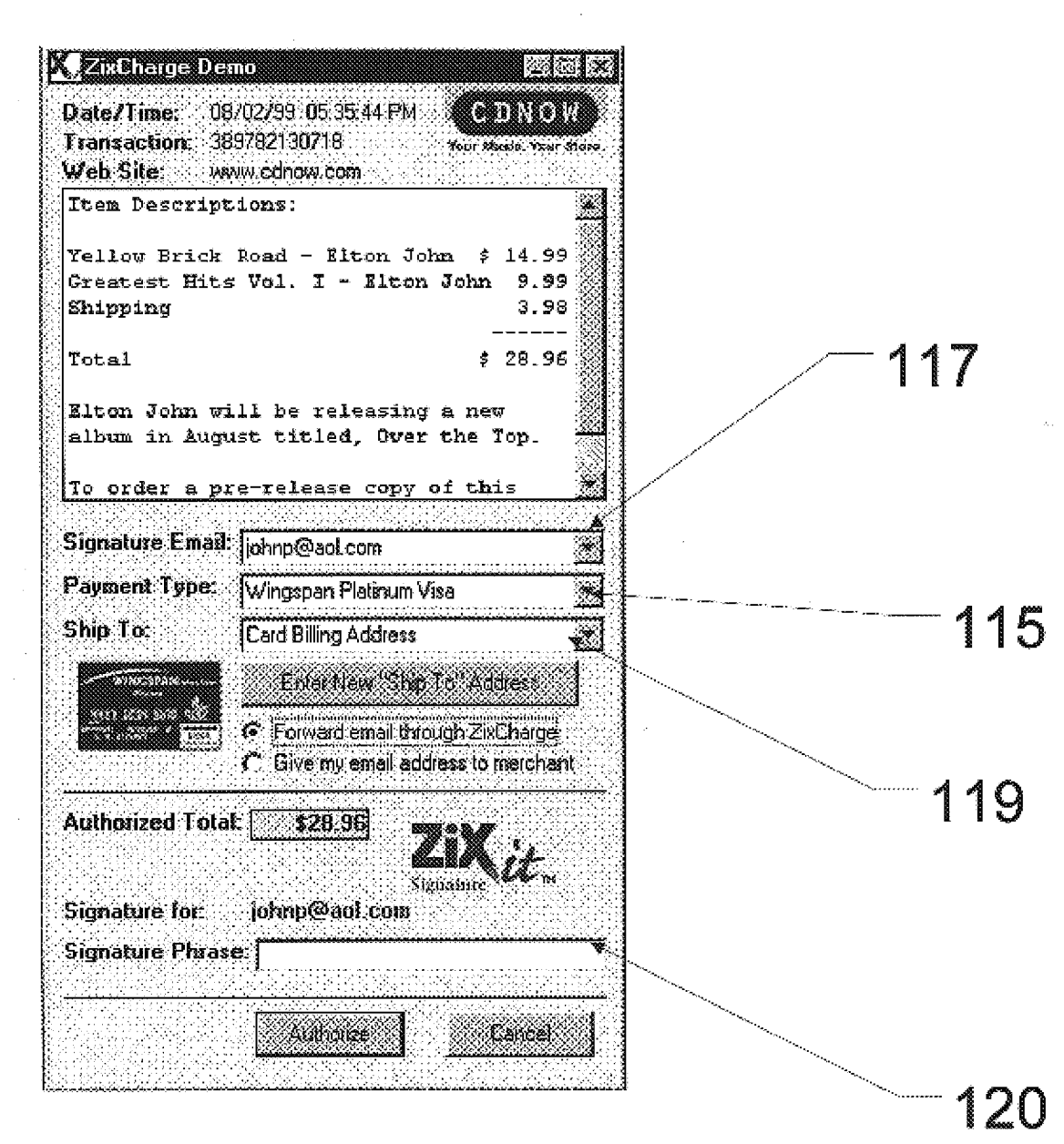

Payment system 100 uses charge slip interface 103 to allow a consumer to digitally sign for a purchase authorization, just as the consumer would do in a retail store. The charge slip interface includes a charge slip application 118 and charge slip 114. Charge slip application 118 interfaces between the merchant (i.e., ZAPI 116) and secure data center 102 in authorizing a transaction. A charge slip, i.e., charge slip 114, is displayed on a consumer's computer terminal and can be initiated by merchant Web site 106 and can include: the merchant logo, detailed purchase information, merchant advertising, and other information as shown in FIG. 2.

When a consumer visiting the merchant Web site elects payment system 100 as the selected form of authorization for a transaction, then charge slip 114 is launched. Charge slip 114 is populated with purchase detail information including a merchant transaction number. Specifically, in one implementation, as the response to the consumer's request, the merchant's web server returns specific MIME data to the member's web browser. The browser can be configured to automatically launch charge slip 114 upon the receipt of the specific MIME data type. In one implementation, the MIME data contains the public key of the merchant. In another implementation, the charge slip can be implemented as an Active X control or a plug-in and can be directly started by the member's browser. Charge slip 114 can generate a random session key and send the session key to ZAPI 116 encrypted by the merchant's public key. ZAPI 116 returns to the charge slip including transaction specific information back to the member's browser encrypted by the session key. The charge slip information is signed by the merchant's signature before being encrypted by the session key.

In one implementation, a time stamp certificate is retrieved from a central time stamp certificate authority (central key server 105) and is attached to the charge slip information before it is signed. This time stamp certificate certifies the time of signing and authenticates other data as described in greater detail in co-pending application entitled "Secure Transmission System," to Gary Liu et. al., filed Jun. 6, 1999, the contents of which are expressly incorporated herein by reference.

Charge slip application 118 executes on the member's computer and opens charge slip 114 sent from merchant Web site 106. Charge slip application 118 decrypts the charge slip information received from the merchant Web site using the session key or other decryption means depending on the method of encryption employed by the merchant site. Once opened, charge slip application 118 retrieves valid payment type aliases and shipping address aliases from secure data center 102 for each valid E-mail address for the member. In one implementation, valid E-mail addresses are stored in a directory managed by a signature manager. These aliases can be retrieved by sending a request to secure data center 102.

Secure data center 102 returns payment type and shipping address alias information for each E-mail address based on the information that has been received from card issuer 112. In one implementation, the alias retrieval request and response can be encrypted by a secret key that is known to both the charge slip application and the secure data center. In order to make this secret key known to both the charge slip application and the secure data center, the key generation process described in co-pending application entitled "Secure Transmission System" can be slightly modified as follows. When the member generates the public/private key pair for an E-mail address, a random secret key is also generated. This secret key is saved to the corresponding key file and can be read by charge slip application 118 without requiring a signature phrase. When the public key and other information is posted to the central key server 105, as described in the co-pending application, this secret key is also posted to the key server. Since the data posted will be encrypted by the key server's public key, this secret key is never exposed to the outside world. The central key sever then saves this secret key in a database, but will not allow anyone except the secure data center to retrieve it.

During alias retrieval, when the secure data center receives the encrypted alias request for a particular E-mail address, the secure data center can retrieve the secret key associated with that E-mail address from the central key server 105. This allows the secure data center to decrypt the request and encrypt the information to be sent back to the charge slip application. In one implementation, secure data center 102 also confirms the validity of the merchant (within payment system 100) and the merchant's associated current processing status (i.e., OK, suspended, etc.).

When the aliases are returned, charge slip application 118 uses the information to populate fields of charge slip 114. Member 10 makes appropriate selections from the available choices of aliases, retrieves a time stamp, generates a digital signature and attaches the signature to the collective information. Once digitally signed, charge slip 114 (the collective information including time stamp certificate) is encrypted and returned to the merchant Web site 106, but it cannot be opened or read at merchant Web site 106. Charge slip 114 is encrypted using a public key for secure data center 102 so that only the secure data center can read it.

Charge slip 114 can include a plurality of selection boxes that can be used by member 110 to designate transaction options, e.g., a particular form of payment or delivery options. For example, charge slip 114 can include a field 115 for designating a particular payment type. Associated with each E-mail account, and stored at the secure data center 102, are member approved types of payment. Information returned from secure data center 102 can include aliases that will be used for designating the particular payment types associated with a given E-mail address. Member 110 can select from available payment options (that is, available pairs of valid E-mail addresses and payment type aliases) by selecting various different E-mail addresses using field 117. In one implementation, member 110 is allowed to enter a previously unknown payment type (and thus over-ride the payment types shown) by providing information such as charge card type, charge card number, charge card expiration date, card billing address, PIN number or other identifying data. Such information can be entered manually by typing the information into a form, or automatically entered from an existing local storage location, such as a "wallet", using a drag and drop mechanism or other procedures. This newly entered payment information can be used only once, or can be added to the member's existing payment types stored at secure data center 102.

Secure data center 102 also can return designated shipping address aliases that can be displayed in a shipping address field 119 on charge slip 114. In one implementation, the shipping address aliases shown can be overridden and a new shipping address can be provided at the time the charge slip is presented. The newly entered shipping address(es) can be used only one time, or can be added to the member's existing shipping addresses stored at secure data center 102. In another implementation, no shipping address designation is required, for example when the transaction contemplates a direct digital download.

Once a desired payment type alias and a shipping address alias are selected, member 110 can digitally sign the charge slip information. The charge slip is signed by providing a signature phrase associated with a given E-mail address in signature phrase field 120 of the charge slip 114. The process for creating and using a signature phrase is described in greater detail in co-pending application "Secure Transmission System." Charge slip application 118, executing at member 110, signs and then encrypts the charge slip information and returns the information to the merchant Web site 106. The process of signing the charge slip information can include retrieving a time stamp certificate from secure data center 102. In one implementation, the time stamp certificate includes merchant and recipient (analogous to sender and recipient) information and can be of the form described in greater detail in co-pending application "Secure Transmission System."

In one implementation, the time stamp certificate is slightly different in that it can include two or more "recipients": one recipient being the merchant and the other being the secure data center. In this case, the time stamp certificate certifies the time and content of the transaction and authenticates the status of all parties involved (the member, the merchant, and the secure data center). The time stamp certificate can be authenticated by a digital signature of the worldwide signature server (central key server 105), which in turn, can be authenticated by at least one public key hardwired into (or otherwise known by) the charge slip application 118, ZAPI 116, and secure data center 102. The use of such time stamp certificates simplifies the verification and authentication processes executed at secure data center 102 when validating authorization requests received.

The time stamp certificate is combined with the other charge slip information prior to signing. The combined data (charge slip data and time stamp certificate data) is digitally signed, encrypted by the public key of secure data center 102, and returned to ZAPI 116 at merchant Web site 106. By attaching the time stamp certificate to the signed charge slip information, the member can establish that his signature is active at the time of signing.

Merchant Charge System Interface—ZAPI

Payment system 100 includes an application (ZAPI 116) that resides on the merchant's computer and interfaces with the merchant Web site 106. ZAPI 116 provides all communication services between merchant Web site 106 and member 110 and between merchant Web site 106 and secure data center 102.

In one implementation, ZAPI 116 initiates charge slip application 118 which, in turn, presents charge slip 114. In one implementation, prior to initiation of the charge slip, a time stamp certificate is retrieved from the central key server 105. More specifically, ZAPI 116 takes a hash of certain charge slip information for the current transaction, and generates a request for a time stamp certificate from the central key server 105. The request for a time stamp certificate can include the hash. The central key server 105 can condition the return of the time stamp certificate upon the validation of the status of the requestor's (the merchant) public key, which is known to the central key server 105. The time stamp certificate, which now contains the hash submitted in the request, is returned to the requestor and then attached by ZAPI to the charge slip. The charge slip information and time stamp certificate can in turn be digitally signed by ZAPI on behalf of the merchant, encrypted, and transmitted to member 110. The certain information can include some or all of the transaction specific information, e.g., the transaction amount. Other data can be included so as to uniquely tie a time stamp certificate request, and its resultant time stamp certificate, to a specific transaction.

Following the completion of charge slip application 118 launching processes, ZAPI 116 receives a package of encrypted information (a "charge slip package") signed (by member 110), including charge slip information and a member time stamp certificate, back from member 110. In one implementation, ZAPI 116 combines a hash of certain unencrypted charge slip information with the returned encrypted package from charge slip 114. The combination can be digitally signed by ZAPI 116 using the merchant's digital signature before sending the combined information to secure data center 102. The certain information can include some or all of the transaction specific information. In one implementation, the certain information includes at a minimum the transaction amount. The process of including a confirming hash inside the signed information, allows secure data center 102 to ensure that no tampering has occurred between the time that the charge slip information is sent by ZAPI 116 to member 110 and the time at which it was returned to ZAPI 116.

The process of signing a document, such as the combined hash and returned encrypted charge slip package, is described in greater detail in co-pending application entitled "Secure Transmission System."

In one implementation, ZAPI 116 can retrieve an additional time stamp certificate from the central key server 105, combine the time stamp certificate with the encrypted signed charge slip information (charge slip package) and the hash and then sign the combination. The signed data can be encrypted (forming the "encrypted signed combined charge slip information" or "ZAPI package") and sent to secure data center 102.

ZAPI 116 can allow a member who has failed an authorization, due to credit limits or other causes, to select a different payment option and then to complete the transaction. In one implementation, the member is allowed to enter all necessary charge card information required to obtain an authorization. This information typically would include charge card type, card billing information, card number, card expiration date and so on. This information can be entered directly by the member or delivered from an electronic wallet or similar software product by drag and drop or other procedures. This feature allows a member to use any charge card accepted by the merchant, even those cards that were not previously registered with payment system 100.

In one implementation, a non-member who has a valid digital signature for an E-mail address can use the system for authorization of a transaction. The non-member can have a member account created at secure data center 102 as part of the transaction authorization process and use that account information for later authorizations. For example, when a non-member selects the authorization system described herein as a payment option, charge application can prompt the non-member for information required to authorize the transaction. In one implementation, the information can be used for a one time approval of the particular transaction or can be used to create an account for the non-member. In one implementation, the member (or non-member) is required to digitally sign any entered information. In either case, the charge card information is encrypted by the public key of secure data center 102 and forwarded through ZAPI 116 to the secure data center 102 for processing. These procedures retain all of the confidentiality features enjoyed by registered members.

After a transaction is approved, ZAPI 116 provides the merchant, via merchant Web site 106, with approval, E-mail communication preferences and shipping information. In one implementation, shipping address information is provided in the E-Commerce Modeling Language or "ECML"

format. If designated by the merchant, this information can be provided in an alternate format. The merchant then completes the transaction recording and fulfillment as if the transaction approval had been obtained directly by the merchant.

Throughout the authorization process, ZAPI 116 adds to an event log. Events that can be logged include "received transaction from merchant," "sent transaction to member," "received signed transaction from member," "sent package to secure data center," "received approval from secure data center," "sent approval to merchant," "sent approval to member," "received verification from merchant," and "sent completion notice to secure data center." These log records can be indexed by transaction number, and each record may contain an abundance of additional information regarding the transaction or the status of tasks. This log is useful for recovery purposes or in a forensic analysis of a transaction.

Note that payment system 100 does not normally change the merchant's current or existing charge card processes, including the clearing and charge-back processes. Payment system 100 is an extension of those existing merchant processes.

Centralized Approval Services

Payment system 100 provides charge approval services at secure data center 102. All incoming charge slip packages are decrypted, validated by the various time stamp certificates and hashes, and authenticated by verifying the digital signatures of both the merchant and the consumer. Secure data center 102, among the other verifications, verifies that the hash of the certain defined data (added by ZAPI 116) matches a hash derived from the same certain data received as part of the encrypted charge slip package (the encrypted charge slip package that is forwarded through the merchant Web site to secure data center 102).

Secure data center 102 formats an authorization request message containing the required information to obtain a charge card authorization on behalf of both the member and the merchant and then forwards the message to the merchant's charge card authorization processor over dedicated communication lines or other communication connections. In one implementation, the message can be forwarded to an alternate authorization processor.

Upon receiving approval, or not, for the authorization, secure data center 102 sends the authorization information and other information back to ZAPI 116 at merchant Web site 106. If a successful authorization has been obtained, the returned information will include any consumer shipping address information that was authorized by member 110 when the charge slip was signed. E-mail communications for any transaction-specific information can be sent through a forwarding proxy server to the member. The merchant can also be given a special member ID for other E-mail purposes or other purposes, such as aggregating purchasing history data. In one implementation, the merchant may send E-mail to the member ID at a forwarding proxy, which then sends the message to the consumer. The consumer is optionally allowed to block the forwarding of messages sent to the member ID.

In one implementation of payment system 100, charge slip data packages can be sent directly from charge slip application 118 to secure data center 102 with any resulting approval returned to charge slip application 118. This approach then allows charge slip application 118 to present the completed authorization directly to ZAPI 116 and correspondingly, to merchant Web site 106.

If the member has entered a new payment or shipping address when signing the charge slip 114, the member can also elect to have the new information saved by payment system 100 for later use.

In one implementation, payment system 100 allows a non-member to become registered by using charge slip 114 for a first time. In this case, the information provided for payment type and shipping address can be verified by appropriate external procedures prior to sending the authorization request to authorization processor 104

The Mall

Mall 108 can be an Internet shopping portal. Merchants who accept authorizations using payment system 100 can have a link posted at mall 108. When consumers shop at mall 108, they are assured that all the mall merchants respect their privacy and are willing to sell merchandise or services to them without collecting personal information that the merchant is not entitled to have. Alternatively, member 110 may directly access a merchant Web site 106 without using mall 108. The merchant may optionally allow these direct access customers to use payment system 100 by the inclusion of a special button or other indicator that allows the consumer to choose this payment procedure. In one implementation, this option is not allowed. Mall 108 provides a convenient mechanism for collecting and presenting merchants who allow authorizations using payment system 100.

Worldwide Signature Server

Secure data center 102 can use a worldwide signature server (i.e., central key server 105) for both time stamp certificate issuance and for verifying certain digital signature key attributes. Alternatively, the signatures can be self-authenticating by attaching a time stamp certificate signed by a central key server's signature which, in turn, is authenticated by at least one public key hardwired into (or otherwise known by) the program that verifies the signature. The central key server 105 is described in greater detail in co-pending application, entitled "Secure Transmission System." The worldwide signature server can provide instant key or E-mail address status indicators which can demonstrate if a key is active, pending, revoked, suspended, changed, deleted and so on. In one implementation, the central key server 105 is co-located with secure data center 102.

Card Issuers

Card issuer 112 generally provides credit services to consumers. Card issuer 112 can be a financial institution. Card issuer 112 functions as any conventional card issuer, making credit determinations based on the individual account holders. Card issuer 112 interfaces with member 110 and secure data center 102. Assuming credit is to be extended or has been extended to the member 110, card issuer 112 prompts member 110 for an E-mail address to associate with the account. Card issuer 112 transmits information including member's 110 E-mail address, other identifying data and card information to secure data center 102. Secure data center 102 uses the E-mail address, in part, to validate the digital signature provided by member 100 on charge slips which are normally submitted through merchant Web site 106.

In one implementation, card issuer 112 can link a member's checking or other account to payment system 100 to allow for payments to be made from the account by signing with a digital signature on charge slip 114 and without issuing physical debit or similar cards.

Alternatively, the paired information (E-mail and charge card) can be provided by an Internet service provider or others, such as a utility company.

Payment System Processes

Figure 3:
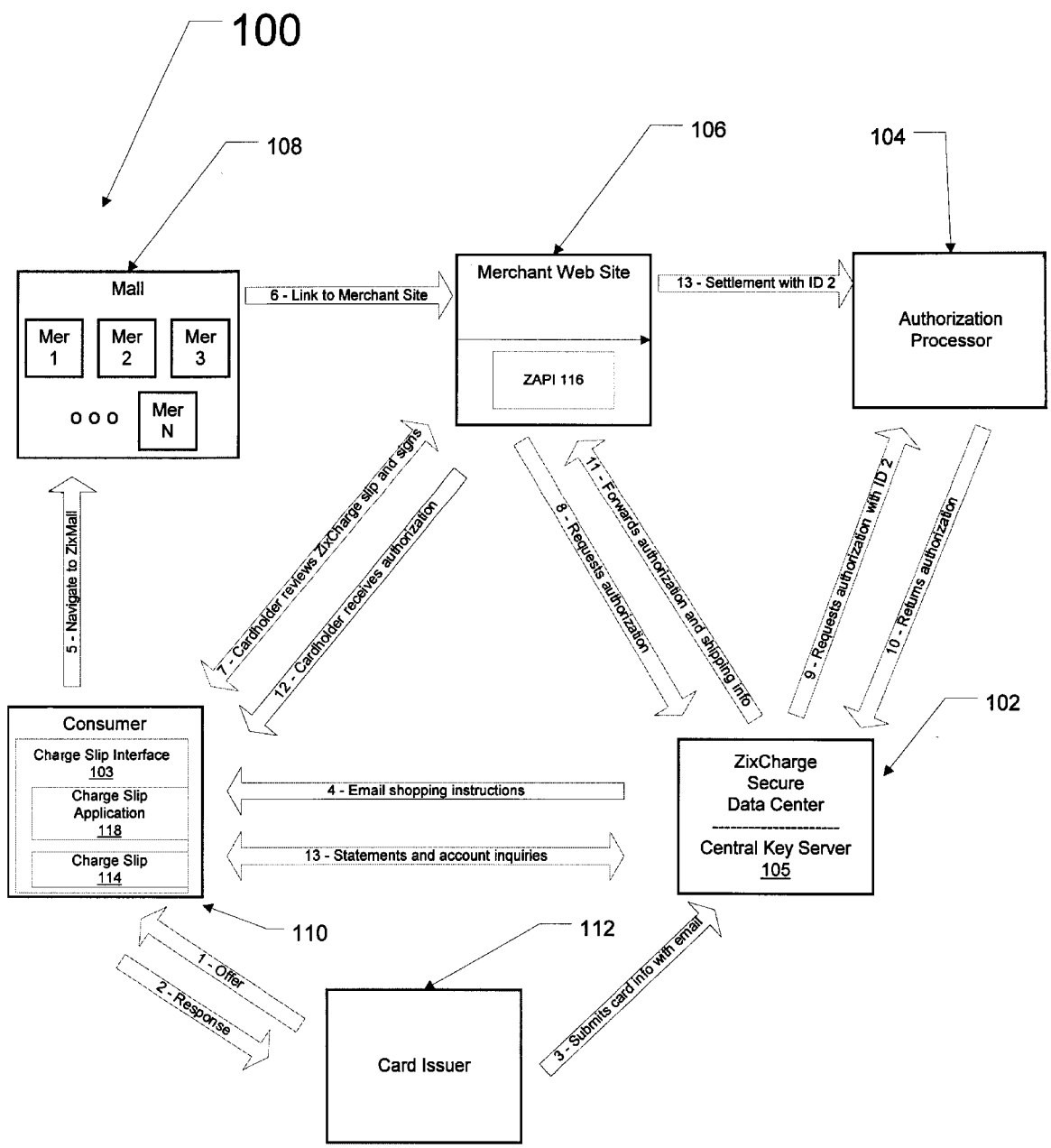
FIG. 3 shows a method for authorizing payment for a transaction using the Internet payment authorization system.

Referring now to FIGS. 1 and 3, a payment system authorization process is shown. Card issuer 112 offers payment system 100 to a consumer, e.g., member 110 (1). Member 110 can respond via secure means, providing their E-mail address back to card issuer 112 (2). The E-mail address can be sent by secure E-mail to card issuer 112 using a secure messaging system or by other means, such as telephone call centers that have authentication abilities.

Card issuer 112 validates the E-mail and, if valid, submits charge card information for the member and the E-mail address to secure data center 102 (3). Member 110 is sent information regarding how payment system 100 operates (4).

Member 110 can visit mall 108 and link to a merchant Web site 106 that offers products or services and that accepts payment system 100 authorizations (5). Mall 108 can include a plurality of links to merchant Web sites that support payment system 100 (6). In one implementation, a plurality of malls can be included with payment system 100 compatibility. In another implementation, the member can directly traverse to a merchant Web site and select payment system 100 at that time.

At merchant Web site 106, member 110 elects various products or services and, at the time for payment, is given an option for payment choices. If member 110 elects payment system 100, then a charge slip will be launched as described above. In one implementation, the choice of payment system 100 is automatic, either through linking or by exclusivity. The charge slip information is signed by ZAPI 116 on behalf of the merchant, encrypted by the session key and then transmitted to member 110. A time stamp certificate can be retrieved and attached to the charge slip prior to signing, encrypting and transmitting to member 110.

The charge slip user interface is presented to member 110. More specifically, application 118 opens charge slip 114, retrieves payment type aliases and shipping address aliases from secure data center 102 and populates charge slip 114 with the transaction information, payment and shipping aliases. The member selects the payment, shipping and other options, and digitally signs the charge slip information (7). The digital signature can be validated by secure data center 102. Signing of a document, e.g., charge slip 114, is discussed in greater detail below. The signing process can include the retrieval of a time stamp certificate from secure data center 102. The signed charge slip (including time stamp certificate) is encrypted and returned to ZAPI 116 at merchant Web site 106.

ZAPI 116 forwards the encrypted charge slip along with other information to secure data center 102 (8). In one implementation, ZAPI 116 can combine a hash of certain unencrypted charge slip information with the returned encrypted signed charge slip information. The combination can be digitally signed by ZAPI 116 using the merchant's digital signature before sending the information (the ZAPI package) to secure data center 102. This process of combining a confirming hash in the signed information, allows the secure data center 102 to ensure that no tampering has occurred between the time that the charge slip information is sent by ZAPI 116 to member 110 and the time at which it was returned to ZAPI as a signed and encrypted charge slip.

Payment system 100 provides charge approval services at secure data center 102. All incoming charge slip packages (ZAPI packages) are decrypted, validated by the various time stamp certificates and hashes, and authenticated by verifying each digital signature of both the merchant and the consumer. Secure data center 102, among the other verifications, verifies that the hash of certain defined data (added by ZAPI 116) matches a hash derived from the same certain data fields received inside the encrypted charge slip package (the encrypted charge slip package that is forwarded through the merchant Web site to secure data center 102).

Secure data center 102 formats an authorization request message containing the required information to obtain a charge card authorization on behalf of both the purchaser and the merchant and then forwards the message to charge card authorization processor 104 over dedicated communication lines or other communication connections (9). In one implementation, the message may be forwarded to an alternate authorization processor.

Upon receiving approval (10), or not, for the authorization, secure data center 102 sends the authorization and shipping information and other information back to ZAPI 116 at merchant Web site 106 (11). If a successful authorization has been obtained, the returned information will include any consumer shipping information that was authorized by member 110 at the time the charge slip was signed. In one implementation, shipping information is provided in an E-Commerce Modeling Language or "ECML" format.

If the member has entered a new payment type or shipping address when signing the charge slip or if the member is new, the member can elect to have the new information entered into payment system 100 for later use. In one implementation, payment system 100 allows a non-member to become registered by using the charge slip 114 for the first time. The payment and shipping address may be verified by an appropriate procedure prior to sending the authorization request to authorization processor 104. ZAPI, as a final step in the process, notifies both charge slip application 118 (12) and secure data center 102 (step not shown) that the transaction has been accepted by the merchant, and in the case of charge slip application 118, provides the approval information that can then be displayed to or printed by member 110. The merchant completes the transaction recording as if the approval had been obtained directly by the merchant.

Transaction authorization information can be made available for secure on-line review by member 110 or can be sent by secure E-mail to member 110 (13).

Detailed Payment System Configuration

Figure 4:
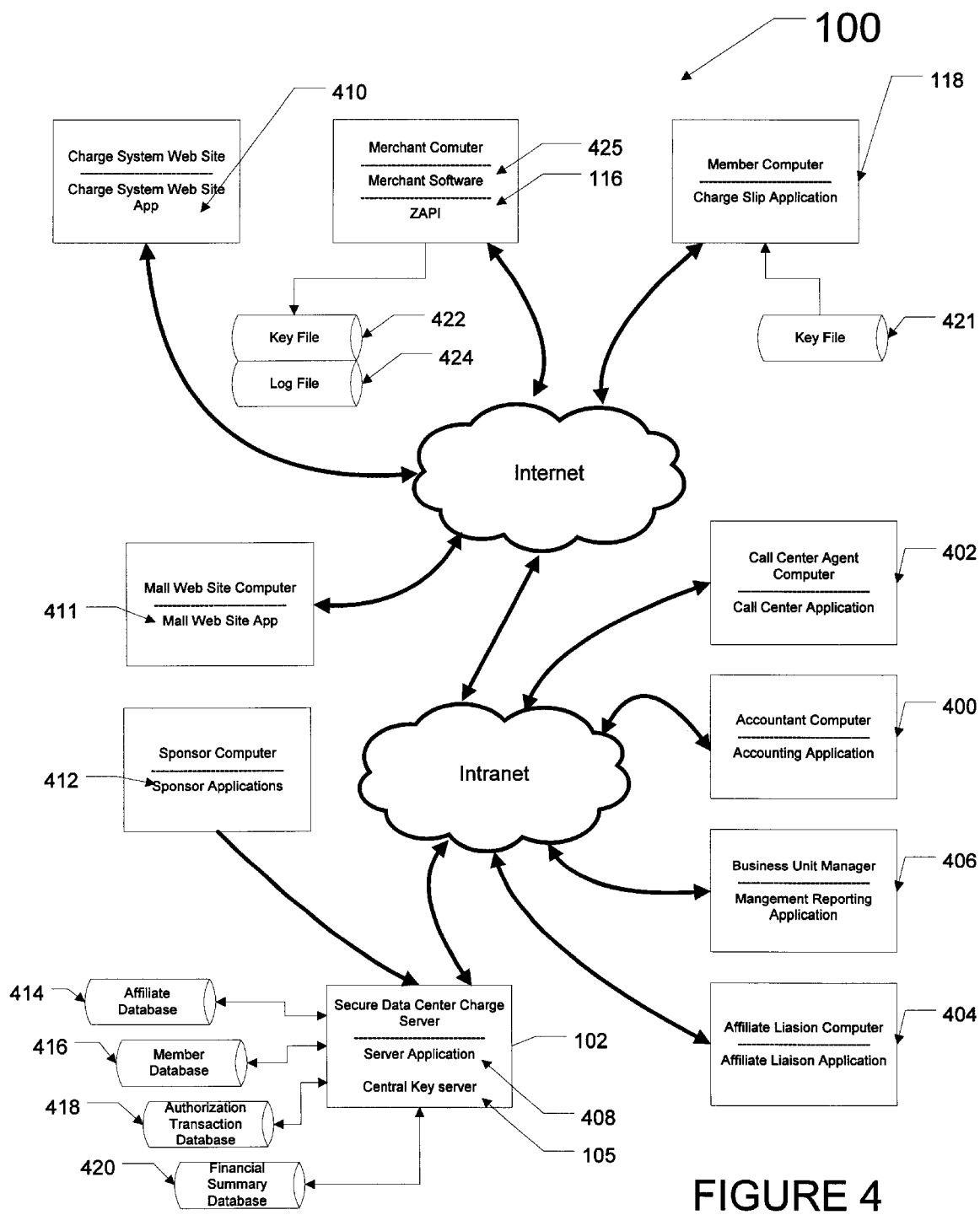
FIG. 4 shows a more detailed view of the payment authorization system of FIG. 1.

Referring now to FIG. 4, a detailed view of the major functional components of the charge authorization portion of payment system 100 is shown. The components include accounting application 400, call center application 402, affiliate liaison application 404, management reporting application 406, server application 408, charge system information web site application 410, mall web site application 411, sponsor application(s) 412, affiliate database 414, member database 416, authorization transaction database 418, financial summary database 420, key files 421 and 422, log file 424, merchant application(s) 425, ZAPI 116, and charge slip application 118.

Accounting application 400 resides on the computers of the accountants. Accounting application 400, among other duties, computes merchant billing information and sponsor fee information and generates financial reports. In one implementation, accounting application 400 resides at secure data center 102.

Call center application 402 resides on the call center agent's computer, allowing the agent to support the members. Call center application 402 is enabled to access customer static data and securely access customer transactions. In one implementation, call center application 402 resides at secure data center 102 allowing call center agents to perform their duties (including remotely) on thin-client computers.

Affiliate liaison application 404 resides on the computer of the affiliate liaison. A liaison interfaces with affiliates. Liaisons are responsible for registering and providing support for inquiries made by affiliates. Liaisons can utilize liaison application 404 when registering affiliates and in support of affiliate inquiries. In one implementation, the registering and support functions are done online or by call center personnel. In one implementation, liaison application 404 resides at secure data center 102 allowing call center or liaison agents to perform their duties (including remotely) on thin-client computers.

Management reporting application 406 resides on the computers of the business unit managers, allowing them to exercise business oversight.

Server application 408 resides on one or more servers located at secure data center 102. Server application 408 is responsible for handling authorization requests, requesting authorization from the appropriate authorization processor 104 and sending the authorization to ZAPI 116. In one implementation, the authorization is sent directly to charge slip application 118.

Server application 408 also handles automatic communication with members including sending E-mail messages to members. Server application 408 also manages the primary databases including storing, maintaining, and querying affiliate information in affiliate database 414, member information in member database 416, transaction information in authorization transaction database 418 and financial summary information in financial summary database 420. Server application 408 can be configured to periodically generate and send member statements by secure E-mail. All internal communications sent or received by server application 408 are typically encrypted.

Charge system information web site 410 resides on a charge Web server computer and is used for advertising product features and can support member and merchant account inquiry and maintenance.

Mall application 411 resides on a Web server and is used to link members to merchant Web sites or to link members to sponsor Web sites.

Payment system 100 and its various components interface with a plurality of external data repositories. Affiliate database 414 stores information about merchants, sponsors or other affiliates. Authorization transaction database 418 stores transaction information. Financial summary database 420 stores summary financial information. Key file 421 resides on the member's computer and stores the encryption-related information, such as keys for E-mail addresses. Key file 422 resides on the merchant's computer and stores encryption-related information, such as private keys. Log file 424 resides on the merchant's computer and stores log and status entries. Member database 416 stores detailed information about members, including E-mail addresses, shipping address information, charge card information and the like.

Payment system 100 interacts, either directly or indirectly, with numerous external systems. Authorization processor 104 (FIG. 1) includes charge card authorization capabilities and software. A computer telephony interface is provided that can be of the form of commercial off-the-shelf software (call center application 402) and is used by call center agents to handle telephony issues. Merchant software (425), such as e-commerce shopping software, used by a merchant to sell goods and services to members, communicates with payment system 100. Network operations center software (not shown) allows operators to observe payment system 100 performance on a real-time basis in order to identify and handle operational problems, and to forecast future hardware and software needs. Sponsor software (412) is owned and used by a sponsor to register members and update their information.

A secure messaging service (not shown) can be used to send communications to members. In one implementation, ZixMail™, available from CustomTracks Corporation, Dallas, Tex., provides secure messaging services.

Security, such as encryption and decryption, can be implemented using the systems and methods described in co-pending application entitled "Secure Transmission System." The engines, processes and methods described therein can be used to encrypt, decrypt, authenticate and validate messages as well as to digitally sign data and to retrieve time stamp certificates from a secure source, such as the central key server 105. Any security method, while described herein as separate, may be built directly into any component of payment system 100.

ZAPI 116 normally resides on the merchant's computer. ZAPI 116 interfaces with merchant software and is responsible for encrypting and decrypting payment system 100 internal communications. Other ZAPI 116 functions include sending and receiving information to and from charge slip application 118 and sending and receiving information to and from secure data center 102.

Charge slip application 118 resides on the member's computer and allows the member to authorize transactions, including payment transactions for goods and services. Charge slip application 118 presents charge slip 114 (FIG. 1) to the member and is responsible for validating merchant information, encrypting and decrypting internal payment system 100 communications, requesting member alias information from server application 408 and sending encrypted transaction-related information to ZAPI 116.

Figure 5:
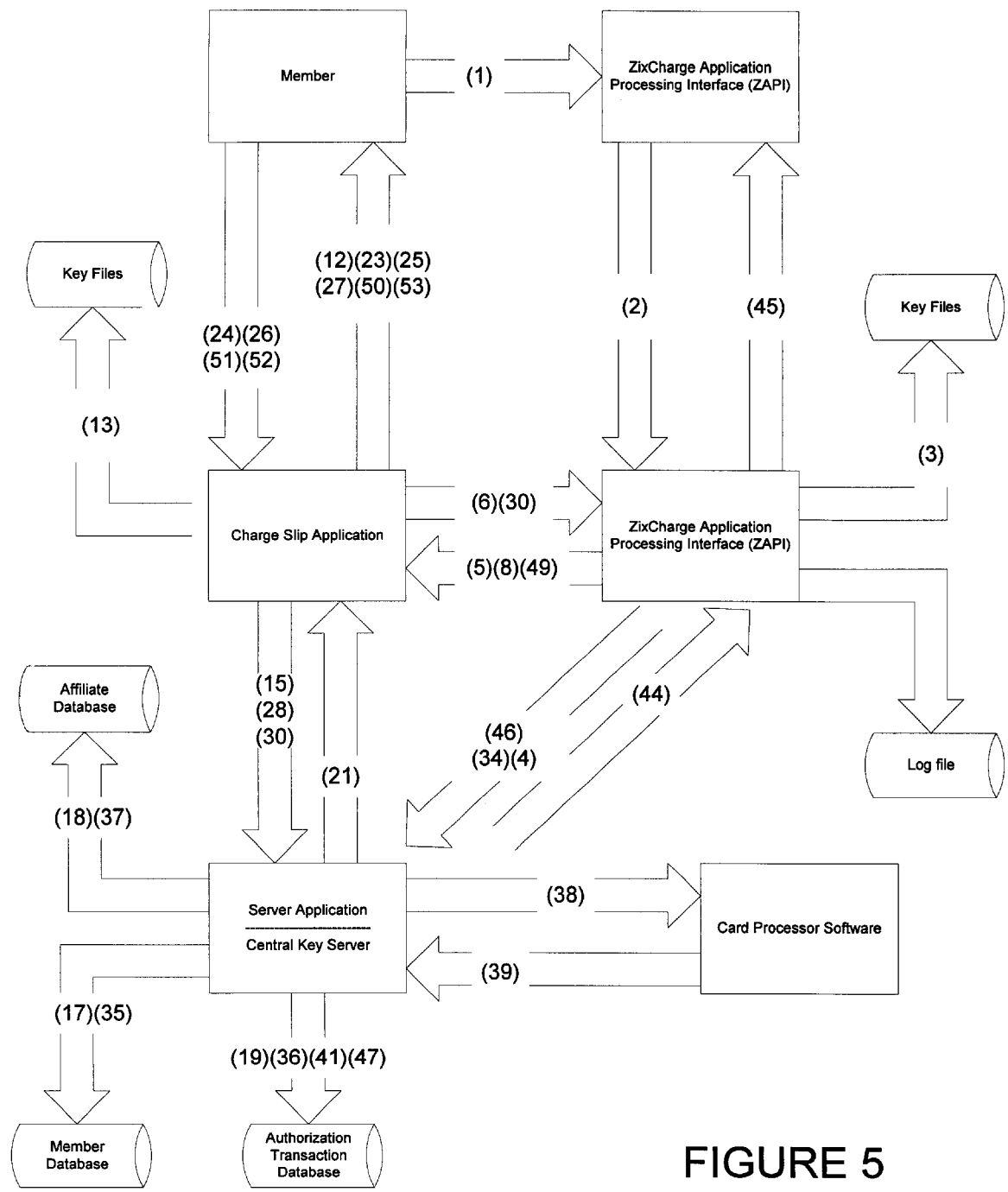
FIG. 5 is a context diagram showing the interaction of the various major components of the payment authorization system of FIG. 1.

Referring now to FIG. 5, a context diagram is shown that provides a context for the interaction of the various components of the transaction authorization system with external actors, data repositories, and systems.

The components interact with various human roles or organizations including affiliates, sponsors, card issuers, Internet service providers, merchants, card processors, members, accountants, administrators, business unit managers, call center agents, merchant liaisons, operators, sponsor liaisons and the like.

Member Initialization

Members must establish an account with payment system 100 and download the client (member) applications, such as charge slip application 118, that are required in order to securely communicate with payment system 100. The member establishes a payment system 100 account by providing one or more E-mail addresses to a charge card issuing financial institution or others. The member is also required to create or have created a digital signature for each of the E-mail addresses using a digital signature manager. The details of the signature manager application are described in greater detail in the co-pending application "Secure Transmission System." The digital signature manager application is used to establish one or more digital signatures for the member or merchant including storing member encryption keys in key file 421 or merchant keys in key file 422.

After a digital signature is established for an E-mail address, and the association of the E-mail address with the charge card is entered into the database of the secure data center, the member is ready to authorize transactions from a merchant Web site. The member can then identify products or services to purchase using merchant provided Web site interface software and can authorize payment using the secure payment system 100 disclosed herein.

Merchant Initialization

A merchant must obtain a merchant account and install ZAPI 116 software in order to be payment system 100-enabled. This is required prior to processing payment authorizations using payment system 100.

Member Authorization for Payments

Member 110 must authorize any payments through payment system 100. The authorization process is described below in great detail. Prior to completion of a successful transaction authorization, a number of pre-conditions are presumed to be valid. The member must have an account with payment system 100 or be able to establish one. The member typically enters a merchant Web site via mall 108 or an affiliated mall. The member has selected at least one item or service for purchase from a merchant. The merchant's public key and member's public key being used are active. The member remembers his signature pass phrase. The member has an approvable payment method that has been registered with payment system 100. All required computers, external services and systems are available.

Referring again to FIGS. 4 and 5, the authorization process begins when the member requests purchase authorization by payment system 100 (1). Typically this occurs when a member selects a check out payment option at the merchant site that indicates payment system 100 as part of the check out procedure. The merchant software then requests a purchase authorization from ZAPI 116 (2). In one implementation, the merchant software sends a message to ZAPI 116 containing merchant information (including data such as the merchant ID code, the merchant's transaction number, date, time, Web site URL, the referring mall identifier, optional promotional logo, and the merchant's approved payment methods) and transaction information-(including optional tagged text, the authorization amount and the location for the charge slip on member's screen). In one implementation, some or all of the merchant information may already reside within ZAPI 116.

Upon receipt of the request, ZAPI 116 reads the merchant's key file 422 (3). Thereafter, ZAPI 116 retrieves a merchant's time stamp certificate from the central key server 105 (4). The retrieval request can include the merchant's public key (or hash thereof) and certain purchase information. In one implementation, the merchant software also initiates charge slip application 118 on the member's computer (5). In one implementation, the charge slip is launched by sending the merchant's public key as a specific MIME data type to the member's web browser. In another implementation, the charge slip can be implemented as an ActiveX control or a plug-in and can be directly started by the browser.

Charge slip application 118 generates a session key and sends it encrypted by the public key of the merchant to ZAPI (6). ZAPI 116 digitally signs the combined purchase information and the time stamp certificate. ZAPI 116, using the session key, symmetrically encrypts the combined and signed data and forwards it to charge slip application 118 to obtain a member 110 approval (8).

Charge slip application 118 decrypts the merchant's encrypted package using the session key. Charge slip application 118 validates the merchant signature as that signature relates to the information sent. Thereafter, charge slip application 118 generally notifies the member that a charge slip is opening (12). In one implementation, charge slip application 118 displays a dialog box that includes a message similar to "Creating Charge Slip" to the member. Charge slip application 118 reads key files 421 (13). More specifically charge slip application 118 retrieves signature information from key files 421. Each key file 421 includes, among other data (some of which is encrypted by a symmetric key associated with the signature phrase), an E-mail address and an associated encryption keys (private key, public key, and a secret key shared between the member and the central key server 105).

Charge slip application 118 creates and encrypts a member and merchant information request. This encrypted request is ultimately forwarded to server application 408 as will be described in greater detail below. In one implementation, the request is symmetrically encrypted using the secret key shared between the member and the central key server 105 as described above. In one implementation, the encrypted data includes the hash of the member's E-mail address(es), the hash(es) of the corresponding member and merchant public key(s), the merchant ID code, the merchant's transaction number and a mall identifier. Charge slip application 118 sends the encrypted member and merchant information request to server application 408 (15).

Server application 408 first retrieves the secret key for the corresponding E-mail address from the central key server 105 and uses it to decrypt the member and merchant information request. In one implementation, each E-mail address has its own secret key used for encryption. Upon validation of the decrypted data. (if necessary), server application 408 queries member database 416 for payment type aliases and shipping address aliases (17). Server application 408 also queries affiliate database 414, using the merchant ID code to obtain the merchant's name and other information.(18).

Server application 408 logs an initial record in authorization transaction database 418 (19). In one implementation, server application 408 logs a unique transaction number, the merchant's code, the merchant's transaction number, the mall identifier, certain hash data and date and time information (local server date and time).

Server application 408 gathers the information retrieved from the queries and creates and encrypts a member and merchant information response using the same secret key or keys that it uses to decrypt the request. In one implementation, the member and merchant response information includes, all available payment type aliases, shipping address aliases, the unique transaction sequence number from the authorization transaction database 418, the merchant name (and other information) and certain merchant status flags. Finally, server application 408 sends the encrypted member and merchant response information to charge slip application 118 (21).

Charge slip application 118 decrypts, using the same secret keys, the member and merchant response information and populates the charge slip with the returned data. Charge slip application 118 thereafter displays charge slip 114 to the member (23). In one implementation, charge slip 114 includes a header information area, a transaction information area, a member options area and a signature area. The header information area can include the date, the time, the merchant's transaction number, Web site URL, a promotional logo and text (rendered) (e.g., see FIG. 2). The transaction information area can include text detailing the transaction and promotional information from the merchant. The member options area can include the choice of signature E-mail addresses, payment type aliases (those that match the merchant's approved payment methods), shipping addresses and E-mail communication method. The signature area can include the authorization amount, a displayed logo for the branded signature vendor, a text-type box in which to type the required signature pass phrase, an "authorize" button and a "cancel" button. In one implementation, a promotional area for sponsors can be included.

The member selects an E-mail address from the available choices displayed on charge slip 114 (24). The available E-mail addresses correspond to particular member accounts that have been registered with the payment system and which have digital signatures on the member computer. The selection is validated by entering the signature pass phrase associated with the E-mail address as is described in greater detail below.

Charge slip application 114 responds by displaying the associated payment type aliases and shipping address aliases for the selected E-mail signature (25). The member completes the charge slip by selecting a payment type alias and a shipping address alias, typing the correct signature pass phrase and clicking on the authorization button (26). Charge slip application 118 notifies the member that it is awaiting authorization by displaying a message similar to "Authorizing—Please Wait" (27).

As part of the authorization process, charge slip application 118 obtains a time stamp certificate from central key server 105 (28). In one implementation, the time stamp certificate is self-authenticating and verifies the merchant's key status and the member's key status at the time the member authorized the transaction (by signing and clicking the authorize button). The time stamp certificate can include a hash of certain charge slip information and can have additional merchant validation information as well. A slightly modified time stamp certificate that allows multiple "recipients" can authenticate all parties involved in the transaction, as described above.

Charge slip application 118 combines the charge slip data and the time stamp certificate and then digitally signs the combination. Charge slip application 118 then encrypts the combined data and sends it to ZAPI 116 (30). In one implementation, the purchase authorization request is encrypted with the public key of the secure data center charge server 408 (the server executing server application 408).

When ZAPI 116 receives the encrypted package from charge slip application 118, it combines confirming information (such as a hash of certain data) with the package and then digitally signs the combination. ZAPI 116 encrypts the combined data and sends the package to server application 408 (34). The package can be encrypted either with public key encryption (using the public key of charge server 408) or with a symmetric key encryption (using a key known to both charge server 408 and ZAPI 116). This shared key may be established and periodically re-established using any key exchange protocol.

Server application 408 decrypts the data package and verifies all signatures and time stamp certificates to ensure data authenticity and consistency. If necessary, server application 408 queries member database 416 for payment card and other information (35). The information retrieved normally includes the actual charge card information, such as card number, expiration date, PIN (if available), billing address data and shipping address data. Server application 408 logs the updated transaction in authorization transaction database 418 (36). More specifically, server application 408 updates the partial transaction including the server date and time, the member's E-mail address, the member's card number and card expiration date (and PIN, if applicable), the selected shipping address, the authorization amount and E-mail communication method selection. Server application 408 also queries the affiliate database for an approval processor associated with the given merchant or card type (37). In one implementation, server application 408 sends a query to affiliate database 414 that includes the merchant code and the payment card type. The affiliate database 414 response includes the appropriate card processor identifier, the leased line or other communication method to the authorization processor and the appropriate transaction number to use during approval processing.

Server application 408 requests purchase authorization from the identified gateway (38). More specifically, server application 408 sends a request that includes the merchant identifier, the assigned transaction number, the name of the member, the card number, the expiration date, the billing address and the total charge. The gateway (authorization processor 104 of FIG. 1) notifies server application 408 that the purchase was authorized, or not (39). More specifically, the gateway sends a response to server application 408 that includes the transaction number and the approval code.

Server application 408 creates a member ID that will be returned to ZAPI 116 (and then to the merchant) along with the approval code and shipping address information. This member ID code may be used by the merchant to track purchasing history for each member without actually knowing the identity of the member. In one implementation, the member ID is created by applying a one-way of two-way hash function to data that includes the member account number and the merchant account number. This type of system can be used to produce the same member ID for each merchant, but will always yield a different ID for any other merchant. In this way, colluding merchants cannot aggregate a member's activities from multiple Web sites.

Server application 408 logs the additional transaction information, including tagged text and the approval code, in the authorization transaction database 418 (41). Server application 408 thereafter creates a data package to return to ZAPI 116. In one implementation, this data package includes the merchant transaction number, the shipping address, the approval code, the approval amount, the transaction number and a modified/encrypted (if appropriate) credit card number (for reconciliation/confirmation processing by merchant). Server application 408 optionally digitally signs and then encrypts the data package using the pre-established symmetric key. Server application 408 then sends the encrypted package to ZAPI 116 (44).

ZAPI 116 decrypts the package. ZAPI 116 validates the package as having been sent by server application 408 (charge server). ZAPI 116 then notifies merchant software 116 that the purchase was authorized (45). In one implementation, ZAPI 116 sends a message to merchant software 116 that includes the merchant transaction number, the shipping address (optionally in ECML format), member ID, E-mail communication information, the authorization code and the authorization amount. ZAPI 116, following the notification of merchant software 116 of the completed transaction approval, sends a message to server application 408 (46) to indicate that the merchant was successfully notified of the approval. This message can include such information as the transaction number and member ID and can be encrypted using the same procedures as used in previous ZAPI 116 to server application 408 communications. Server application 408 then finalizes the transaction record in authorization transaction database 418 (47) and marks the record as completed. Failing to complete this step would open inconsistencies in records between the merchant and authorization processor 104, which in turn, would lead to difficulties in reconciliation procedures between the parties. Again, the communication between ZAPI and the charge server can be encrypted by the pre-established symmetric key.

ZAPI 116 then generates and encrypts a display authorization message that is to be sent to charge slip application 118. The display authorization message can include the authorization code and the URL of the next window in the merchant's Web site. ZAPI 116 sends the message to charge slip application 118, encrypted by the session key between ZAPI and the charge slip application (49).

Charge slip application 118 decrypts the display authorization message. Charge slip application 118 notifies the member that the purchase was authorized (50). More specifically, charge slip application 118 displays a notification to the member that can include an authorization text message, the authorization code, an exit button and a print button. The member can depress the print button (51), resulting in the printing of a charge slip image for the member. The member can thereafter depress the exit button (52) and the transaction is complete.

Charge slip application 118 closes charge slip 114 ending the session and forwards the member to the merchant's next URL (if any) (by either direct the current web browser window to the new URL or open a new browser window with the new URL)(53). If all of the steps complete, the following post conditions are guaranteed: 1) the transaction is authorized; 2) the complete transaction is stored in transaction authorization database 418; 3) the merchant is notified of the approval; and, 4) the member is forwarded to the merchant-designated next URL.

The process described in relation to FIG. 5 is success oriented. If at any point in time a fault or error condition arises, the transaction can be halted. In general, faults can arise when any of the indicated steps can not be properly completed. When a fault arises, one or more remedial steps can be performed or the transaction can be terminated. If the transaction is terminated, the merchant and member can be notified. As described above, if the member has insufficient credit to make the purchase (or otherwise fails authorization based on the authorization reply), ZAPI 116 can request that charge slip application 118 allow the member to make another selection from the remaining available payment type aliases (if any) and then to attempt to complete the transaction anew.

While this invention has been described in terms of several preferred implementations, it is contemplated that alterations, modifications and permutations thereof will become apparent to those skilled in the art upon a reading of the specification and study of the drawings. For example, the system can be used to provide any form of transaction authorization, regardless of whether specific payments or other monetary transfers are implied. Payment system 100 can be used for authorization of payments from pre-paid balance accounts or for authorizations to accounts that will be billed to, or charged to, a consumer at a later time. In addition, while a system has been described where ZAPI sends charge authorization requests to the server application, the request can be directly sent to the server application by the charge slip application. The authorization response then can be sent back to the charge slip application and the charge slip application can then notify the merchant through ZAPI that the transaction is approved or denied. Furthermore, certain terminology has been used for the purposes of descriptive clarity, and should not be construed to limit the invention.

What is claimed:

1. A method for authorizing a transaction between a consumer and a merchant over a network where the anonymity of the consumer with respect to the merchant is maintained while still validating the authenticity of the consumer prior to completing the transaction, the method comprising:
   registering consumer payment information at a payment server;
   launching a charge slip application including securely transferring unique transaction information for display to the consumer;
   digitally signing the charge slip by the consumer, encrypting the charge slip and consumer digital signature with a payment server key;
   digitally signing the encrypted charge slip data for the merchant;
   authenticating the consumer, the merchant and the transaction details at the payment server; and
   requesting authorization of the transaction from a card processor and, upon approval, returning an approval and shipping information for the consumer to the merchant so that the transaction can be completed.

2. The method of claim 1, wherein the step of registering consumer payment information includes creating payment information aliases.

3. The method of claim 2 further comprising:
   retrieving the consumer's aliases for payment information from the payment server; and
   completing the charge slip including selecting payment information aliases to set a payment method and shipping address.

4. The method of claim 1, wherein the step of digitally signing the encrypted charge slip for the merchant includes signing at the merchant's computer.

5. The method of claim 1, wherein the step of registering consumer payment information includes creating aliases pointing to the payment information, the payment information including the consumer charge card information and one or more authorized addresses where purchases can be shipped, each alias identifying one of a registered charge card or a valid shipping address.

6. The method of claim 5 further comprising:
   retrieving the consumer's aliases for payment information from the payment server; and
   completing the charge slip including selecting one charge card alias and shipping address alias.

7. The method of claim 6, wherein the step of completing the charge slip includes not selecting one of the available shipping address aliases and entering a new shipping address on the charge slip for the transaction.

8. The method of claim 7, wherein entering a new shipping address includes designating an alias for the new shipping address and updating the payment information stored at the payment server to include the new shipping address and associated alias.

9. The method of claim 1 further comprising linking the payment information to an E-mail address associated with the consumer.

10. The method of claim 1 further comprising receiving a request at the merchant to authorize payment for the transaction.

11. The method of claim 1 further comprising retrieving a merchant time stamp certificate.

12. The method of claim 11, wherein the step of launching a charge slip on the consumer's computer includes transferring unique transaction information and the merchant's time stamp certificate to the consumer.

13. The method of claim 12 further comprising:
retrieving a consumer time stamp certificate; and
combining the consumer time stamp certificate and the charge slip prior to digitally signing the charge slip.

14. The method of claim 13 further comprising transferring the encrypted charge slip, consumer digital signature, merchant time stamp certificate and consumer time stamp certificate back to the merchant.

15. The method of claim 11 further comprising:
retrieving merchant validation information and consumer aliases for payment information from the payment server; and
authenticating the merchant and charge slip data using the merchant time stamp certificate and retrieved validation information.

16. The method of claim 1 further comprising:
retrieving a consumer time stamp certificate; and
combining the consumer time stamp certificate and the charge slip prior to digitally signing the charge slip.

17. The method of claim 1 further comprising combining the encrypted charge slip and consumer digital signature with confirming data;
digitally signing the newly combined information for the merchant; and
transferring the digitally signed newly combined information to the payment server.

18. The method of claim 1 further comprising notifying the consumer of the completed transaction; and
notifying the payment server that the merchant has received the approval from the payment server so that the transaction can be completed.

19. The method of claim 1, wherein communications between the consumer and merchant are encrypted using a session key created at the consumer's computer.

20. The method of claim 1, wherein the step of launching a charge slip includes displaying transaction details and a merchant logo on the charge slip.

21. The method of claim 1 further comprising:
if approval is denied due to insufficient credit for the selected payment option, prompting the consumer to select another payment option including selecting a different payment information alias.

22. The method of claim 1 further comprising logging each partial transaction with the payment server including logging requests for aliases, approvals and notifications to the merchant in a transaction log at payment server.

23. The method of claim 1, wherein the payment information includes a consumer E-mail notification selection, the E-mail notification selection configurable by the consumer to enable one of a plurality of notification options.

24. The method of claim 23, wherein the notification options are selected from direct E-mail and forward proxy, and where the method further includes
determining which notification option has been selected;
if the direct E-mail option is selected, providing the consumer's E-mail address to the merchant with the approval thereby allowing the merchant to contact the consumer to complete any details of the transaction; and
if the forward proxy option is selected, creating a consumer E-mail address alias, returning the alias to the merchant along with the approval and forwarding to the consumer messages from the merchant that are addressed to the E-mail address alias.

25. The method of claim 1 further comprising retrieving a merchant time stamp certificate and consumer time stamp certificate where the time stamp certificates are self-authenticating.

26. The method of claim 25, wherein a time stamp certificate is authenticated by a certificate chain that is rooted from at least one public key known by the program code.

27. The method of claim 1, wherein the digital signatures are self-validating.

28. The method of claim 1 frothier comprising generating, at the payment server, a report of transactions completed for a consumer.

29. The method of claim 28, wherein the reports are generated on a periodic basis according to a pre-defined schedule.

30. The method of claim 28, wherein the reports are generated upon request from the consumer.

31. The method of claim 1 further comprising completing the charge slip including not selecting the registered payment information and entering new payment information on the charge slip for the transaction.

32. The method of claim 31 further comprising registering the new payment information at the payment server.

33. The method of claim 1 further comprising:
if approval is denied due to insufficient credit for the selected payment option, prompting the consumer to enter new payment information.

34. The method of claim 1, wherein communications from the consumer to the payment server are encrypted using a symmetric key encryption.

35. A method for authorizing a transaction between a consumer and a merchant over a network where the anonymity of the consumer with respect to the merchant is maintained while still validating the authenticity of the consumer prior to completing the transaction, the method comprising:

registering consumer payment information at a payment server including creating aliases for the payment information, the payment information including the consumer charge card information and one or more authorized addresses where purchases can be shipped, each alias identifying either a registered charge card or a valid shipping address;

launching a charge slip on the consumer's computer including transferring unique transaction information and a merchant's time stamp certificate to the consumer;

retrieving merchant validation information and the consumer's aliases for payment information from the payment server;

authenticating the merchant and transaction details using the validation information and the merchant's time stamp certificate;

completing the charge slip including selecting a payment alias and shipping address alias;

retrieving a consumer time stamp certificate;

combining the consumer and merchant time stamp certificates and the completed charge slip including digitally signing and encrypting the combined data with a payment server key;

transferring the encrypted combined data back to the merchant;

digitally signing the encrypted combined data for the merchant;

transferring the encrypted combined data and merchant digital signature to the payment server;

authenticating the consumer, the merchant and the transaction details at the payment server; and requesting authorization of the transaction from a card processor and, upon approval, returning an approval and shipping information for the consumer to the merchant so that the transaction can be completed.

36. A method for authorizing a transaction between a consumer and a merchant over the Internet where the anonymity of the consumer with respect to the merchant is maintained while still validating the authenticity of the consumer prior to completing the transaction, the method comprising:

registering consumer payment information at a payment server including creating aliases pointing to the payment information, the payment information including the consumer charge card information and one or more authorized addresses where purchases can be shipped, each alias identifying one of a registered charge card or a valid shipping address;

linking the payment information to an E-mail address associated with the consumer;

receiving a request at the merchant to authorize payment for the transaction;

retrieving a merchant time stamp certificate;

launching a charge slip on the consumer's computer including securely transferring unique transaction information and the merchant's time stamp certificate to the consumer;

retrieving merchant validation information and the consumer's aliases for payment information from the payment server;

authenticating the merchant and charge slip data using the merchant time stamp certificate and retrieved validation information;

completing the charge slip including selecting one payment alias and shipping address alias;

retrieving a consumer time stamp certificate;

combining the charge slip, consumer time stamp certificate and merchant time stamp certificate;

digitally signing the combined information;

encrypting the digitally signed information with a payment server key;

transferring the encrypted information back to the merchant;

combining the transferred information with confirming data;

digitally signing the newly combined information for the merchant;

transferring the digitally signed newly combined information to the payment server;

authenticating the consumer, the merchant and the transaction details at the payment server;

requesting authorization of the transaction from a charge card processor and, upon approval, returning an approval and shipping information for the consumer to the merchant;

notifying the consumer of the completed transaction; and notifying the payment server that the merchant has received the approval from the payment server so that the transaction can be completed.

37. The method of claim 36, wherein the step of authenticating the merchant and charge slip data includes verifying a hash of certain transaction information included in the merchant time stamp certificate matches data sent with a digital signature from the member.

38. The method of claim 36, wherein the confirming data includes a hash of transaction specific data included in the charge slip launched onto the consumer's computer.

39. The method of claim 38, wherein the confirming data is a hash of an amount being authorized.

40. A method for authorizing a transaction between a consumer and a merchant over the Internet where the anonymity of the consumer with respect to the merchant is maintained while still validating the authenticity of the consumer prior to completing the transaction, the method comprising:

receiving a request at the merchant to authorize payment for the transaction;

retrieving a merchant time stamp certificate;

launching a charge slip on the consumer's computer including transferring unique transaction information and the merchant's time stamp certificate to the consumer;

receiving an encrypted completed charge slip including the merchant time stamp certificate, a consumer time stamp certificate and consumer digital signature;

digitally signing the encrypted completed charge slip producing a merchant digital signature;

transferring the encrypted completed charge slip and a merchant digital signature to the payment server;

requesting authorization of the transaction from the payment server and, upon approval, receiving an approval and shipping information for the consumer so that the transaction can be completed;

notifying the consumer of the completed transaction; and notifying the payment server that the approval was received.

41. The method of claim 40 further comprising:

combining the encrypted completed charge slip and confirming data; and digitally signing the combined data.

42. The method of claim 41, wherein the confirming data is transaction specific information provided from the merchant to the consumer when launching a charge slip for the transaction.

43. The method of claim 42, wherein the confirming data is a hash of transaction specific data.

44. The method of claim 40 further comprising:

combining the encrypted completed charge slip and confirming data;

digitally signing the combined data; and encrypting the digitally signed combined data.

45. A method for authorizing a transaction between a consumer and a merchant over the Internet where the anonymity of the consumer with respect to the merchant is maintained while still validating the authenticity of the consumer prior to completing the transaction, the method comprising:

registering consumer payment information at a payment server including creating aliases for the payment information, the payment information including the consumer charge card information and one or more authorized addresses where purchases can be shipped, each alias identifying either a registered charge card or a valid shipping address;

requesting an authorization for payment for the transaction including sending a request to the merchant;

receiving instructions to launch a charge slip on the consumer is computer and a merchant time stamp certificate;

displaying the charge slip including unique transaction information;

retrieving the merchant validation information and the consumer's aliases for payment information from the payment server;

authenticating the merchant and the transaction details using the merchant time stamp certificate and validation information;

completing the charge slip including selecting a payment alias and shipping address alias;

retrieving a consumer time stamp certificate;

combining the completed charge slip, consumer time stamp certificate and merchant time stamp certificate;

digitally signing the combined information;

encrypting the digitally signed information with a payment server key;

transferring the encrypted information back to the merchant for forwarding to the payment server; and receiving notice of a transaction approval.

46. The method of claim 45 further comprising printing the approval notice.

47. A method for authorizing a transaction by a payment server between a consumer and a merchant over the Internet where the anonymity of the consumer with respect to the merchant is maintained while still validating the authenticity of the consumer prior to completing the transaction, the method comprising:

storing consumer payment information including aliases, the payment information including the consumer charge card information and one or more authorized addresses where purchases can be shipped, each alias identifying either a registered charge card or a valid shipping address;

retrieving the consumer's aliases for payment information and merchant validation information when prompted by the consumer and returning the aliases and validation information to the consumer;

receiving a request for payment authorization from the merchant, the request including an encrypted completed charge slip produced by the consumer, confirming information produced by the merchant, a consumer digital signature, a merchant digital signature, a consumer time stamp certificate and a merchant time stamp certificate;

authenticating the consumer and the merchant using the digital signatures;

validating the transaction by comparing unique transaction information found inside the encrypted charge slip produced by the consumer with confirming data received from the merchant; and requesting authorization of the transaction from a card processor and, upon approval, returning an approval and shipping information for the consumer to the merchant so that the transaction can be completed.

48. The method of claim 46 further comprising processing requests from each of the merchant and the consumer for a time stamp certificate, each time stamp certificate including transaction details and a time stamp certified by the payment server.

49. The method of claim 48 frothier comprising sending requests for time stamp certificates to a central key server for processing.

50. The method of claim 48 further comprising processing time stamp certificates at a central key server co-located with the payment server.

51. An apparatus for authorizing a transaction between a consumer and a merchant over a network where the anonymity of the consumer with respect to the merchant is maintained while still validating the authenticity of the consumer prior to completing the transaction, the apparatus comprising:

a payment server including server application operable to register consumer payment information and store the payment information in a member database;

a merchant application operable to launch a charge slip application including securely transferring unique transaction information for display to the consumer;

a consumer application including
  a user interface for displaying a charge slip,
  a digital signature engine for digitally sign the charge slip for the consumer,
  an encryption engine for encrypting the charge slip and consumer digital signature with a payment server key, and
  a transfer engine for transferring the encrypted charge slip and consumer digital signature to the merchant;
where the merchant application includes a digital signature engine for digitally signing the encrypted charge slip data for the merchant and transfer engine for transferring the digitally signed encrypted charge slip data to the payment server
where the payment server includes an authentication engine for authenticating the consumer, the merchant and the transaction details and where the server application is operable to request authorization for the transaction from a card processor and, upon approval, return an approval and shipping information for the consumer to the merchant so that the transaction can be completed.

52. The apparatus of claim 51, wherein the server application is operable to create payment information aliases.

53. The apparatus of claim 52, wherein the consumer application is operable to retrieve the consumer's aliases for payment information from the payment server and complete the charge slip including selecting payment information aliases to set a payment method and shipping address.

54. The apparatus of claim 51, wherein the consumer application is operable to receive a new shipping address for entry on the charge slip for the transaction.

55. The apparatus of claim 54, wherein the consumer application is operable to prompt a consumer for an alias for the new shipping address and update the payment information stored at the payment server to include the new shipping address and associated alias.

56. The apparatus of claim 51, wherein the payment information is linked to an E-mail address associated with the consumer.

57. The apparatus of claim 51 where the merchant application is operable to retrieve a merchant time stamp certificate.

58. The method of claim 57, wherein the merchant application is operable to transfer unique transaction information and the merchant's time stamp certificate to the consumer.

59. The apparatus of claim 58, wherein the consumer application is operable to retrieve a consumer time stamp certificate and combine the consumer time stamp certificate and the charge slip prior to digitally signing the charge slip.

60. The apparatus of claim 51, wherein the consumer application is operable to retrieve merchant validation information and consumer aliases for payment information from the payment server and includes an authentication engine for authenticating the merchant and charge slip data using the merchant time stamp certificate and retrieved validation information.

61. The apparatus of claim 51 where the merchant application is operable to combine the encrypted charge slip and consumer digital signature with confirming data, the digital signature engine operable to digitally sign the newly combined information for the merchant and the transfer engine operable to transfer the digitally signed newly combined information to the payment server.

62. The apparatus of claim 51 further comprising notification means for notifying the consumer of the completed transaction and notifying the payment server that the merchant has received the approval from the payment server so that the transaction can be completed.

63. The apparatus of claim 51, wherein each of the consumer and merchant include encryption means for encrypting communications between the consumer and merchant using a session key created at the consumer's computer.

64. The apparatus of claim 51, wherein merchant application includes a launching engine for launching the display of a charge slip on a consumer's computer, where the charge slip includes transaction details and a merchant logo.

65. The apparatus of claim 51, wherein the server application is operable to, if approval is denied due to insufficient credit for the selected payment option, prompt the consumer to select another payment option and select a different payment information alias.

66. The apparatus of claim 51, wherein the server application is operable to log each partial transaction with the payment server including logging requests for aliases, approvals and notifications to the merchant in a transaction log.

67. The method of claim 51, wherein server application is operable to generate a report of transactions completed for a consumer, on a periodic basis according to a pre-defined schedule.

68. The method of claim 67, wherein the reports are generated upon request from the consumer.

69. The apparatus of claim 51, wherein the consumer application is operable to prompt the consumer to enter new payment information on the charge slip for the transaction.

70. The apparatus of claim 69 the consumer application is operable to register the new payment information at the payment server.

71. The apparatus of claim 51, wherein the consumer application is operable to, if approval is denied due to insufficient credit for the selected payment option, prompt the consumer to enter new payment information.

72. The apparatus of claim 1, wherein each of the consumer and payment server include encryption means for encrypting communications from the consumer to the payment server using symmetric key encryption.

* * * * *

UNITED STATES PATENT AND TRADEMARK OFFICE
CERTIFICATE OF CORRECTION

PATENT NO. : 6,675,153 B1
DATED : January 6, 2004
INVENTOR(S) : David P. Cook and Gary G. Liu It is certified that error appears in the above-identified patent and that said Letters Patent is hereby corrected as shown below:

Title page,
Item [56], References Cited, OTHER PUBLICATIONS, please delete "Sydtem" and insert -- System -- therefor.

Column 22,
Line 11, please delete "frothier" and insert -- further -- therefor.

Column 25,
Line 2, please delete "consumer is" and insert -- consumer's -- therefor.
Line 65, please delete "frothier" and insert -- further -- therefor.

Signed and Sealed this

Twenty-seventh Day of July, 2004

JON W. DUDAS
*Acting Director of the United States Patent and Trademark Office*